United States Patent [19]

Huntington

[11] Patent Number: 4,798,673

[45] Date of Patent: Jan. 17, 1989

[54] SEQUENCING CHANNEL WASTE WATER REACTOR

[75] Inventor: Clyde Huntington, Elgin, Ill.

[73] Assignee: Lakeside Equipment, Bartlett, Ill.

[21] Appl. No.: 69,863

[22] Filed: Jul. 6, 1987

[51] Int. Cl.⁴ .............................................. C02F 3/14
[52] U.S. Cl. .................................. 210/629; 210/926; 210/194
[58] Field of Search .............. 210/629, 926, 194, 620, 210/608, 202, 534

[56] References Cited

U.S. PATENT DOCUMENTS

| | | | |
|---|---|---|---|
| 4,614,589 | 9/1986 | Weis | 210/926 |
| 4,626,353 | 12/1986 | Beard et al. | 210/926 |

FOREIGN PATENT DOCUMENTS

| | | | |
|---|---|---|---|
| 1932640 | 2/1971 | Fed. Rep. of Germany | 210/629 |
| 60-68096 | 4/1985 | Japan | 210/926 |
| 8301500 | 11/1984 | Netherlands | 210/926 |

OTHER PUBLICATIONS

Krüger; Technical Brochure, "Oxidaton Sitch Type VR".

*Primary Examiner*—Benoit Castel
*Attorney, Agent, or Firm*—Wood, Dalton, Phillips, Mason & Rowe

[57] ABSTRACT

A reactor for waste water including a vessel 10 having two elongated outer channels 26, 28 sandwiching an elongated inner channel 30 with all the channels 26, 28 and 30 being connected to each other at both opposed ends thereof, a gate 64 at one of the ends 18 and movable between a first position isolating the channel 26 from the channels 28 and 30 and a second position isolating the channel 28 from the channels 26 and 30, rotors 32, 34 for each of the channels 26, 28 for aerating waste water in the vessel 10 and for causing the waste water to flow in the corresponding channels 26, 28 as well as the inner channel 30, and a pair of effluent outlets 98, 100, located at the end 18 and spaced to be on opposite sides of the gate 64, each selectively operable to withdraw effluent from the the outer channels 26, 28 on the associated side of the gate 64.

13 Claims, 3 Drawing Sheets

SEQUENCING CHANNEL WASTE WATER REACTOR

FIELD OF THE INVENTION

This invention relates to waste water treatment, and more specifically, to a vessel in which an activated sludge process may be practiced and which further may be sequenced so as to achieve clarification, as well as a method of operation of such a vessel.

BACKGROUND OF THE INVENTION

Various means have been employed over the years to practice the so-called activated sludge process for treating waste water. One conventional apparatus is a so-called "oxidation ditch" wherein an elongated vessel is provided with a central wall dividing the vessel into two channels connected at their opposed ends. Some sort of means, frequently a rotor, is employed to introduce oxygen into the waste water and move the same through the oxidation ditch in a closed loop path.

Effluent from the ditch is frequently taken to a separate vessel which acts as a clarifier or, in the alternative, may enter a separator within the oxidation ditch, frequently mounted on one of the side walls thereof, from which clarified liquid may be withdrawn.

While these various structures have generally worked quite well for their intended purpose, they are not without cost, particularly where a separate clarification vessel must be constructed. In order to avoid the cost difficulties, the prior art has proposed the use of so-called sequencing batch reactor processes to accomplish the same thing. In these reactors, a single vessel is first used for aeration. After attaining the desired degree of aeration, the aeration process is halted and clarification is allowed to occur with withdrawal of the clarified effluent. Once withdrawal of the clarified effluent has been accomplished to the desired degree, the aeration process may be reinstituted.

Again, while this type of structure and process work well for their intended purpose, batch operation is not desirable, or even tolerable in every instance since influent flow, though variable, is generally continuous.

The present invention is directed to overcoming one or more of the above problems.

SUMMARY OF THE INVENTION

It is the principal object of the invention to provide a new and improved reactor vessel wherein both aeration and clarification may occur on a continuous basis. It is also an object of the invention to provide a new and improved method of continuously providing aeration and clarification in a single vessel.

According to one facet of the invention, the foregoing objects are obtained in a structure including a vessel having two elongated outer channels sandwiching an elongated inner channel with all of the channels being connected to each other at opposed ends. A gate at one of the ends is movable between a first position isolating one of the outer channels from the other outer channel and the inner channel and a second position isolating the other outer channel from the one outer channel and the inner channel. Oxygen introducing means are provided in at least one channel. A pair of impelling means are provided, one for each of the outer channels for causing such waste water to flow therein and through the inner channel. Each of the impelling means is selectively operable so that the flow of such waste water may occur in only one of the outer channels at a given time. There is further provided a pair of effluent outlets, located at the one end and spaced to be on opposite sides of the gate with each being selectively operable to withdraw clarified effluent from the outer channel on the associated side of the gate when waste water is not flowing through the associated channel.

As a consequence of this construction, the inner channel and one of the outer channels may be utilized for aeration while the other outer channel is utilized for clarification. The gate may then be moved to the other position allowing the first outer channel to be used for clarification and the inner channel and the other outer channel for aeration. As a consequence, a continuous process which does not require a separate clarifier is provided.

The invention also contemplates that there be an influent inlet opening generally to the inner channel near the one end and between the first and second positions of the gate.

In a preferred invention, the vessel includes a bottom and at least one of the outer channels, near the one end and to the outer channel side of the gate, includes a sludge outlet in the bottom.

A highly preferred embodiment of the invention contemplates that the effluent outlets open to a common collector channel and that there be an effluent control for allowing effluent to exit the collector channel along with scum return means associated with the collector channel and operable prior to the effluent control to cause scum from the vessel entering the collector channel to be returned to the vessel before effluent exits the collector channel.

The invention also contemplates that the inner channel be defined by spaced, elongated walls in the vessel which terminate short of the ends thereof with the gate being pivoted to a vessel wall centrally of the one end so as to pivot between the elongated walls. The invention further contemplates that the impelling means are both operable to impel waste water toward the one end so that selective operation of the impelling means may be utilized to create hydraulic forces for moving the gate between the positions thereof.

According to another facet of the invention, there is provided a method of treating waste water in a single vessel which comprises the steps of (a) providing within the vessel three side by side, elongated channels which are interconnected at their opposed ends such that there exists a central channel flanked by two outer channels, (b) flowing waste water in a closed loop through the central channel and one of the outer channels while isolating the downstream end of the other outer channel from the closed loop, (c) introducing oxygen into the waste water as it flows in the closed loop, (d) removing clarified waste water from the other outer channel, (e) thereafter flowing waste water in a second closed loop through the central channel and the other outer channel while isolating the downstream end of the one outer channel from the second closed loop, (f) introducing oxygen into the waste water as it flows in the second closed loop, (g) removing clarified waste water from the one outer channel and (h) sequentially repeating steps (b), (c) and (d) followed by steps (e), (f) and (g) to provide a continuous process.

In a highly preferred embodiment, steps (d) and (g) are respectively performed near the downstream ends of the respective outer channels and the direction of flow in a central channel is the same for the performance of both steps (b) and (e).

The invention contemplates that the isolating provided in steps (b) and (e) be performed by moving a single flow director which is movable between a first position wherein it provides the isolating required by step (b) and a second position wherein it provides the isolating required by step (e).

Other objects and advantages will become apparent from the following specification taken in connection with the accompanying drawings.

DESCRIPTION OF THE PREFERRED EMBODIMENT

Figure 1:
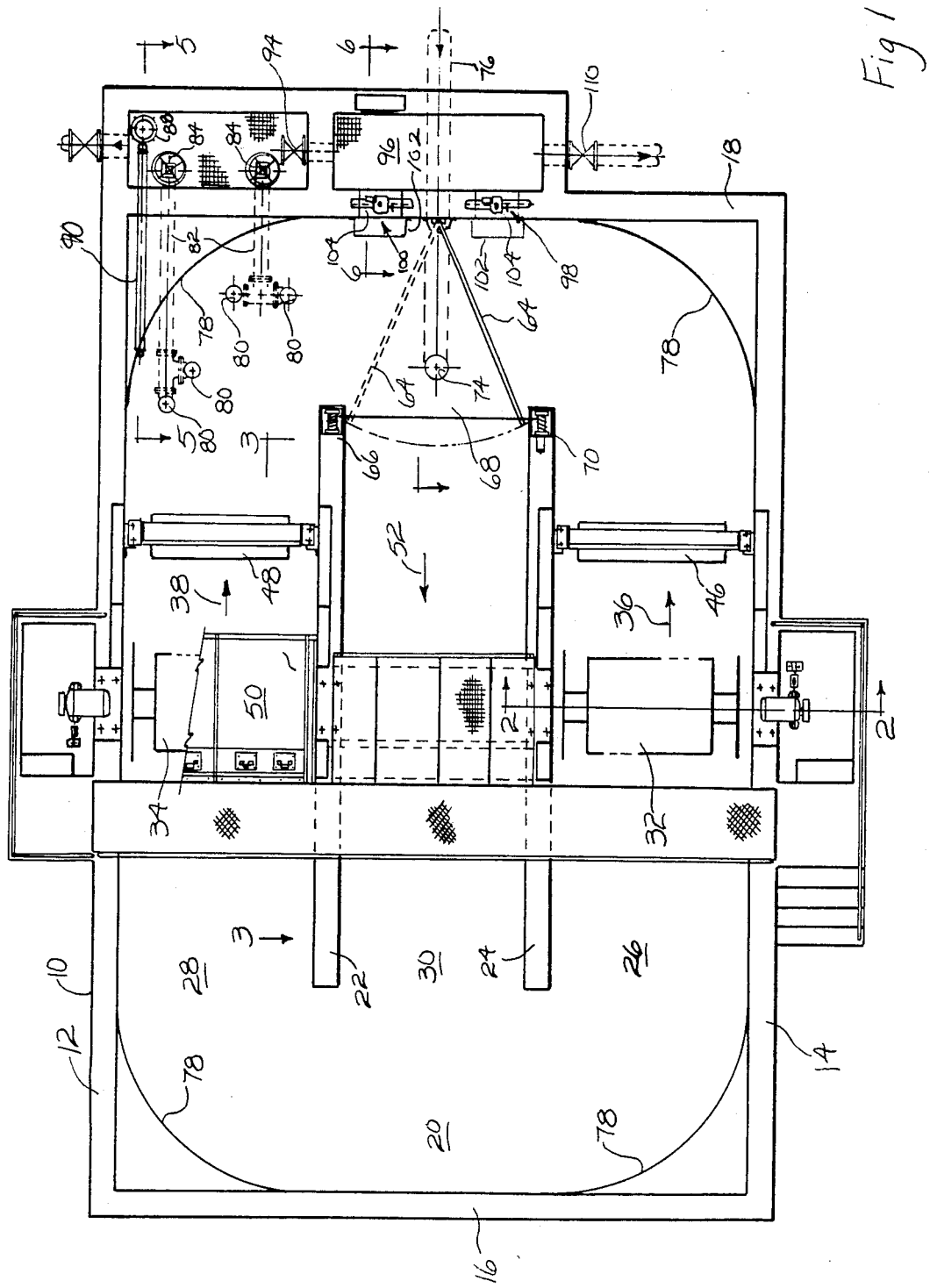
FIG. 1 is a plan view of a reactor vessel made according to the invention.

An exemplary embodiment of a reactor made according to the invention is illustrated in the drawings and in reference to FIG. 1 is seen to include a rectangular vessel, generally designated 10 having opposed side walls 12 and 14 connected by opposed end walls 16 and 18. The various walls are preferably formed of concrete and will be located principally below grade. A concrete bottom 20 will also be provided.

Generally parallel to the side walls 12 and 14 are elongated interior walls 22 and 24 which are spaced from but generally parallel to each other. The walls 22 and 24 stop short of both the end walls 16 and 18 and as a consequence, together with the vessel walls, define a first outer channel 26, a second outer channel 28, and a central or inner channel 30 which is sandwiched by the outer channels 26 and 28.

Figure 3:
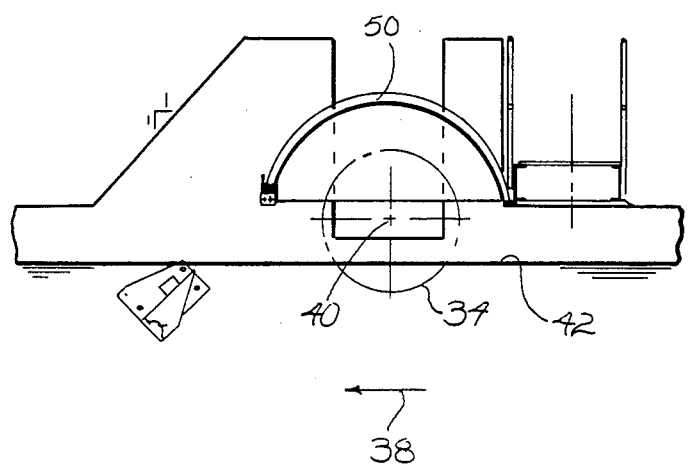
FIG. 3 is a fragmentary, vertical section taken approximately along the line 3—3 in FIG. 1.

Conventional motor driven aeration rotors 32 and 34 are located above the channels 26 and 28, respectively. The aeration rotors 32 and 34 serve both to impel waste water in the vessel in the direction of arrows 36 and 38 respectively within the channels 26 and 28 and to introduce oxygen into the waste water therein. However, in most cases separate impelling and oxygenating means could be used if desired. As seen in FIG. 3, each rotor has an axis of rotation 40 above the intended level 42 of waste water within the vessel 10 and part of the periphery of the rotor extends below such level. Rotation of the rotor 32 or 34 will drive the waste water toward an associated adjustable baffle 46 or 48 and each rotor 32 and 34 may be provided with a rotor cover 50, an exemplary one of which is illustrated in FIG. 3.

If desired, a similar rotor construction may be supported by the walls 22 and 24 to operate in the central channel 30 and would act in conjunction with the rotor 32 or the rotor 34 to cause flow in the direction of an arrow 52 within the central channel 30. Even without such a rotor, either the rotor 32 or the rotor 34 will cause flow to occur within the central channel 30 in the direction of the arrow 52.

Figure 2:
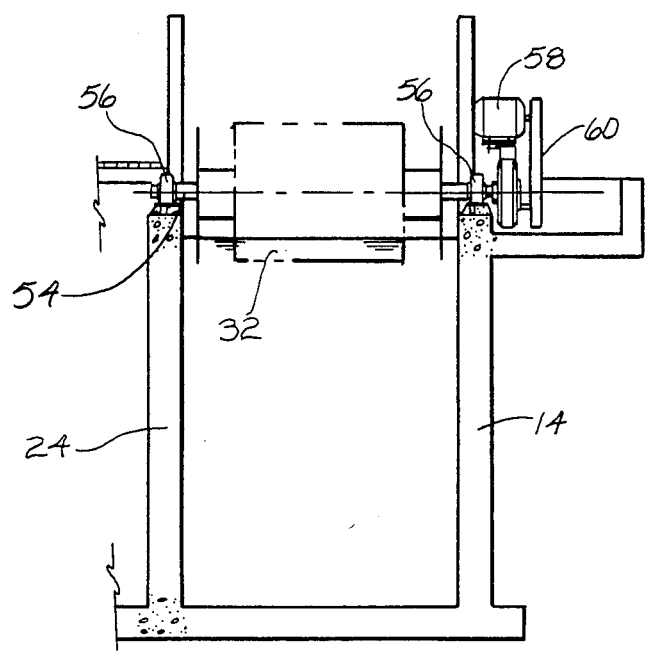
FIG. 2 is a vertical section taken approximately along the line 2—2 in FIG. 1.

The rotors 32 and 34 are located on elongated shafts 54 as best seen in FIG. 2 and extend between one of the inner walls 22 or 24 in the corresponding side wall 12 or 14 as the case may be. Each shaft 54 is journaled in pillow block bearings 56 mounted on the upper surfaces of such walls and a unidirectional electric motor 58 is provided for driving the shaft 54 via any suitable speed reduction system, generally designated 60.

Figure 4:
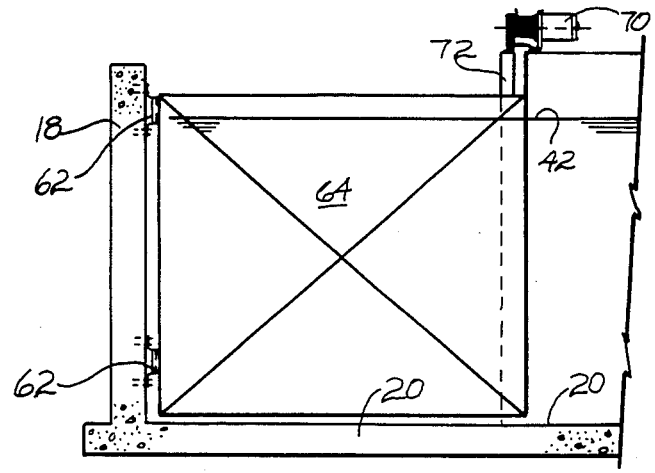
FIG. 4 is a fragmentary elevation of a gate used in the vessel with parts shown in section.

Turning now to FIGS. 1 and 4, centrally of the end wall 18, there is provided a pair of vertically spaced hinges 62 which define a vertical pivot axis for a gate 64 pivotally mounted thereon. The gate 64 extends from substantially the bottom 20 of the vessel to a location above the water line 42 and has a horizontal extent from the vertical axis defined by the hinges 62 so as to abut either interior wall 22 and/or 24 as shown in solid and dotted lines respectively in FIG. 1.

The wall 22 mounts a spring reel 66 for take up of a cable 68 while a motor driven reel 70 is mounted on the wall 24. The cable 68 is connected to the gate 64 by means of an upright 72 on the same as shown in FIG. 4. Thus, by operating the motor driven reel 70, the gate 64 may be shifted between the solid line position illustrated in FIG. 1 wherein the downstream end of the channel 26 is isolated from flow in the channels 28 and 30 and the second position shown in dotted lines in FIG. 1 where the opposite is true. That is to say, the downstream end of the channel 28 is isolated from flow occurring in the channels 26 and 30.

Thus, two closed loop flow paths may be defined dependent upon the position of the gate 64. Both closed loop flow paths involve the central channel 30 and differ from one another in the particular one of the outer channels 26 and 28 as being utilized.

At a location relatively close to the end wall 18, and located between the solid and dotted line positions of the gate 64, the bottom 20 may be provided with an influent port or inlet 74 connected by a conduit 76 to any suitable source of influent. Thus, the port 74 will always be in fluid communication with the flow path in use regardless of the position of the gate 64.

If desired, flow baffles 78 may be disposed in the various corners of the vessel 10 to smooth flow and in the preferred embodiment, adjacent the end wall 18, at least one of the outer channels 26 and 28 is provided with sludge removal ports 80 located in the bottom 20. Conduits 82 below the bottom 20 extend to manually operable valves 84 by which sludge deposited on the bottom 20 during the classification operation of the vessel can be removed therefrom.

Figure 5:
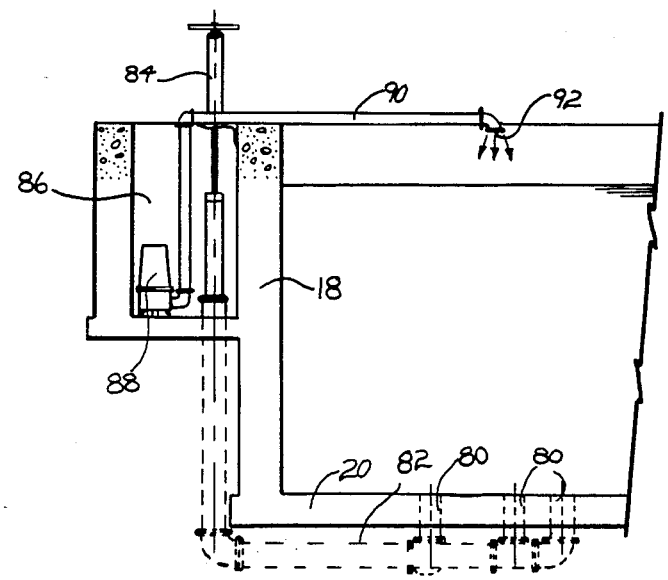
FIG. 5 is a fragmentary sectional view taken approximately along the line 5—5 in FIG. 1.

If desired, and as best shown in FIG. 5, exteriorly of the end wall 18, a scum collector channel 86 may be provided. Within the collector channel 86 is a submersible pump 88 having an outlet 90 which extends over the top of the wall 18 to terminate in an outlet 92 above the channel 28. Scum deposited within the collector channel 86 may be returned to the vessel 10 for aeration through operation of the pump.

Figure 6:
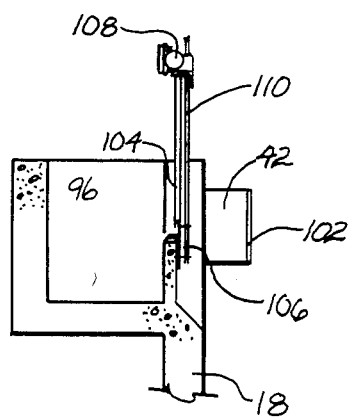
FIG. 6 is a fragmentary sectional view taken approximately along the line 6—6 in FIG. 1.

Scum may be deposited in the collector channel 86 by a motorized scum control valve of conventional construction illustrated at 94 in FIG. 1. The valve 94 controls fluid communication between the collector channel 86 and a similar effluent collector channel 96 also exteriorly of the end wall 18 but located centrally thereof. As best seen in FIG. 1, two effluent outlets, generally designated 98 and 100, are located in the upper edge of the end wall 18, one on each side of the hinges 62. The effluent outlets 98 and 100 each include a three sided scum baffle 102 each mounted to the interior of the wall 18 so as to extend just above as well as below the water level 42 as best seen in FIG. 6. Each effluent outlet includes a recess or notch 104 in the top of the wall 18 through which clarified waste water within the vessel 10 may flow to the effluent channel 96. Control of such flow is obtained by means of a weir plate 106 mounted for vertical movement on the wall 18. A selectively operable bidirectional motor 108 drives a screw shaft 110 by which the vertical position of the weir 106 can be controlled.

The vessel is preferably operated as follows. Waste water to be treated is continuously introduced into the vessel through the port 74 and with the components in the positions illustrated in FIG. 1, the rotor 34 is operative to impel the waste water in the direction of the arrows 38 and 52 in a closed loop through the channels 28 and 30. At the same time, the rotor 34 will be introducing oxygen into the waste water, that is, aerating the waste water.

Previously aerated waste water will be standing relatively motionless within the channel 26 because the latter is isolated from the closed loop flow path just defined by the gate 64 in its solid line position. This allows settling to occur. Clarified effluent will simultaneously be withdrawn from the vessel 10, and specifically from the upstream end of the channel 26 via the effluent outlet 98.

When the desired quantity of clarified waste water has been removed, operation of the rotor 34 is halted and operation of the rotor 32 initiated. As a result, waste water will begin to flow within the channel 26 in the direction of the arrow 36. Simultaneously, the actuator 70 will be operated to move the gate 64 to the dotted line position illustrated in FIG. 1. The initiation of flow in the direction of the arrow 36 within the channel 26 will also create hydraulic forces that are applied against the gate 64 to assist in moving the gate 64 to the dotted line position 64.

The cessation of operation of the rotor 34 as well as the movement of the gate 64 to the dotted line position shown in FIG. 1 will result in the halting of flow within the channel 28 and the instigation of flow in a second closed loop through the channels 26 and 30. Because flow has been halted in the channel 28, settling will occur and clarified effluent may be removed from the effluent outlet 100.

If needed, sludge removal via the sludge removal ports 80 may occur at this time as well.

This process is repeated sequentially to provide continuous aeration in the channel 30 and one or the other of the channels 26 and 28 while allowing withdrawal of clarified effluent from the unused aeration channel 26 or 28.

Preferably, when the change is made by shifting the gate 64 to one position or the other, an effluent control valve 110 connected to the compartment 96 by which effluent may exit the vessel will be closed and the scum control valve 94 opened. Thus, any scum that may have accumulated against the weir plate 106 while closed or within the scum baffle 102 may be directed to the collector channel 86 via the scum control valve to be returned to the vessel. After the scum control valve 94 has been open for a sufficient period of time to assure that all scum finding its way to effluent collector channel 96 has been removed to the channel 86, it may be closed and the effluent valve 110 opened to allow clarified effluent to exit the vessel.

Those skilled in the art will appreciate that a number of advantages flow from the reactor of this invention and process of operating the same.

First, separate clarifiers are not required as one portion of the vessel is isolated and clarified liquid is drawn off from the isolated areas simultaneously with aeration occurring in other parts of the vessel.

Second, in the preferred embodiment the process requires not a single control gate to alternately isolate one or the other of the outer channels which then may act as the settling tank or clarifier in the process.

Third, according to the process, aeration and influent flow are continuous, avoiding the problems associated with batch operation.

Fourth, the waste water flows in the same direction at all times and does not require that the rotors be provided with reversing motors or mechanisms. This eliminates the extended periods of time when aeration is not being provided to some part of the vessel and eliminates dwell time between cycling aeration and settling areas. It also eliminates any need for expensive electromechanical or electronic reversing starters that may be required in other processes or vessels.

Fifth, the vessel and process operate with a separate rotor in each aeration channel and, if desired, can be provided with a rotor in the common central channel which can then be used as a complete standby unit for the process.

Sixth, a scum control system allows the first portion of effluent to be returned to the treatment process thereby providing for the flushing away of any solids that may have accumulated around the weir before the effluent is removed from the vicinity of the treatment plant.

I claim:

1. A sequencing reactor for waste water, comprising:
means defining a vessel having two elongated outer channels sandwiching an elongated inner channel, with all said channels being connected to each other at both opposed ends;
an influent inlet to said vessel;
a sludge outlet from said vessel;
a gate at one of said ends and movable between a first position isolating one of said outer channels from the other outer channel and the inner channel and a second position isolating said other outer channel from said one outer channel and said inner channel;
a pair of impelling means, one for each of said outer channels, for causing such waste water to flow therein and through said inner channel, each said impelling means being selectively operable so that flow of such waste water may occur in only one of said outer channels at a given time; and
a pair of effluent outlets, located at said one end and spaced to be on opposite sides of said gate and each being selectively operable to withdraw effluent from the outer channel on the associated side of said gate.

2. The sequencing reactor of claim 1 wherein said influent inlet opens generally to said inner channel near said one end and between said gate first and second positions.

3. The sequencing reactor of claim 1 wherein said vessel includes a bottom and at least one of said outer channels, near said one end, and to the outer channel side of said gate when in the one of said first and second position closest to said one outer channel includes said sludge outlet in said bottom.

4. The sequencing reactor of claim 1 wherein said outlets open to a common collector channel, an effluent control for allowing effluent to exit said collector channel and scum return means associated with said collector channel and operable prior to said effluent control to cause scum from said vessel entering said collector channel to be returned to said vessel before effluent exits said collector channel.

5. The sequencing reactor of claim 1 wherein said inner channel is defined by spaced, elongated walls in said vessel terminating short of the ends thereof and said gate is pivoted to a vessel wall centrally of said one end to pivot between said elongated walls, and said impelling means are both operable impel waste water toward said one end, whereby selective operation of said impelling means may be utilized to create hydraulic forces for moving said gate between said positions.

6. A sequencing reactor for waste water, comprising:
means defining a vessel having two elongated outer channels; and an elongated inner channel separated from the outer channels by two spaced walls with all said channels being connected to each other at both opposed ends;
an influent inlet to said vessel;
a sludge outlet from said vessel;
a gate pivotally mounted centrally of one of said ends and movable about a vertical axis between a first position isolating one of said outer channels from the other outer channel and the inner channel and a second position isolating said other outer channel from said one outer channel and said inner channel;
a pair of impelling means, one for each of said outer channels, for causing such waste water to flow therein toward said one end and then through said inner channel, each said impelling means being selectively operable so that flow of such waste water may occur in only one of said outer channels at a given time; and
a pair of effluent outlets, located at said one end and spaced to be on opposite sides of said gate and each being selectively operable to withdraw effluent from the outer channel on the associated side of said gate.

7. A method of treating waste water in a single vessel comprising:
(a) providing in said vessel three side by side, elongated channels, interconnected at their opposed ends such that there exists a central channel flanked by two outer channels;
(b) flowing waste water in a closed loop through said central channel and one of said outer channels while isolating one end of the other outer channel from the closed loop;
(c) introducing oxygen into the waste water as it flows in said closed loop;
(d) removing clarified waste water from said other outer channel near said one end thereof;
(e) thereafter flowing waste water in a second closed loop through said central channel and said other outer channel while isolating one end of said one outer channel from said second closed loop;
(f) introducing oxygen into the waste water as it flows in said second closed loop;
(g) removing clarified waste water from said one outer channel near said one end thereof; and
(h) sequentially repeating steps (b), (c) and (d) followed by steps (d), (f) and (g).

8. The method of claim 7 wherein steps (b) and (e) are respectively performed near the downstream ends of the respective outer channel.

9. The method of claim 7 where the direction of flow in said central channel is the same for the performance of both steps (b) and (e).

10. The method of claim 7 wherein the isolating of steps (b) and (e) is performed by moving a single flow director between a first position providing the isolating of step (b) and a second position providing the isolating of step (e).

11. The method of claim 10 wherein said flow director is a gate and the direction of flow in said central channel is the same for the performance of both step (b) and (e); the direction of flow in said outer channels further being such as to assist in moving said gate between said position as step (h) is performed.

12. A sequencing reactor for waste water, comprising:
means defining a vessel having three, generally parallel channels, with all said channels being connected to each other at opposed ends;
an influent inlet to said vessel;
a sludge outlet from said vessel;
gate means associated with said channels and movable between a first position isolating one of said channels from the other channels and a second position isolating another of said channels from the remaining channels;
means in said channels for introducng oxygen into waste water therein;
means in said channels for causing waste water to flow in the nonisolated channels;
and a pair of effluent outlets, located with respect to said gate means so as to be selectively operable to withdraw effluent from the isolated one of the channels while fow of waste water is occurring in the others of the channels.

13. The sequencing reactor of claim 12 wherein said introducing means and said flow causing means comprise aeration rotors.

* * * * *